United States Patent
Fujimoto (10) Patent No.: US 10,668,943 B2
(45) Date of Patent: Jun. 2, 2020

(54) ELECTRIC DRIVE DEVICE AND ELECTRIC POWER STEERING DEVICE

(71) Applicant: Hitachi Automotive Systems, Ltd., Hitachinaka-shi, Ibaraki (JP)

(72) Inventor: Masao Fujimoto, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 79 days.

(21) Appl. No.: 15/757,571

(22) PCT Filed: Feb. 16, 2017

(86) PCT No.: PCT/JP2017/005638
§ 371 (c)(1),
(2) Date: Mar. 5, 2018

(87) PCT Pub. No.: WO2017/154499
PCT Pub. Date: Sep. 14, 2017

(65) Prior Publication Data
US 2019/0023305 A1 Jan. 24, 2019

(30) Foreign Application Priority Data
Mar. 9, 2016 (JP) .................... 2016-045427

(51) Int. Cl.
*H02K 5/10* (2006.01)
*B62D 5/04* (2006.01)
(Continued)

(52) U.S. Cl.
CPC ......... *B62D 5/0406* (2013.01); *B62D 5/0463* (2013.01); *B62D 6/10* (2013.01);
(Continued)

(58) Field of Classification Search
CPC ...... B62D 5/04; B62D 5/0403; B62D 5/0406; B62D 5/0409; B62D 5/0418; B62D 5/0421
See application file for complete search history.

(56) References Cited

U.S. PATENT DOCUMENTS

2008/0278918 A1   11/2008  Tominaga et al.
2011/0254388 A1*  10/2011  Yamasaki ............ B62D 5/0406
                                                310/43

(Continued)

FOREIGN PATENT DOCUMENTS

JP     2008-273476 A    11/2008
JP     2010-51062 A     3/2010
(Continued)

OTHER PUBLICATIONS

International Search Report (PCT/ISA/210) issued in PCT Application No. PCT/JP2017/005638 dated Mar. 21, 2017 with English-language translation (five (5) pages).
(Continued)

*Primary Examiner* — Tony H Winner
(74) *Attorney, Agent, or Firm* — Crowell & Moring LLP (57) ABSTRACT

A heat radiation base body extending in a direction of a rotation shaft of an electric motor close to the rotation shaft is provided at an end surface of a motor housing accommodating the electric motor. A board of one electronic control unit of a redundant system is fixed to the heat radiation base body along the direction in which heat radiation base body extends with thermal conduction allowed. A board of the other electronic control unit of redundant system is fixed to the heat radiation base body along a direction in which the heat radiation base body extends, so as to face the board of one electronic control unit, with thermal conduction allowed. A cover covering these is fixed to an end surface of the motor housing without a bolt. Thus, a housing accom- (Continued)

modating the electronic control unit is not necessary. A sealing part is only the connecting portion between the motor housing and cover, thereby eliminating additional structure of the sealing part, sealing component required for seal and bolt.

12 Claims, 6 Drawing Sheets

(51) Int. Cl.

| | | |
|---|---|---|
| *H02K 5/22* | (2006.01) | |
| *H02K 9/22* | (2006.01) | |
| *H02K 11/33* | (2016.01) | |
| *B62D 6/10* | (2006.01) | |
| *H02K 9/02* | (2006.01) | |
| *H02K 11/21* | (2016.01) | |

(52) U.S. Cl.
CPC .............. *H02K 5/225* (2013.01); *H02K 9/02* (2013.01); *H02K 9/22* (2013.01); *H02K 11/33* (2016.01); *B60Y 2400/307* (2013.01); *H02K 11/21* (2016.01)

(56) References Cited

U.S. PATENT DOCUMENTS

| | | |
|---|---|---|
| 2011/0285336 A1 | 11/2011 | Fujita et al. |
| 2012/0161689 A1 | 6/2012 | Yamasaki |
| 2013/0062137 A1 | 3/2013 | Motoda |
| 2013/0257232 A1* | 10/2013 | Tomizawa .............. H02K 29/08 310/68 R |
| 2014/0153198 A1* | 6/2014 | Yamasaki ............ H05K 7/1432 361/747 |
| 2015/0222156 A1 | 8/2015 | Tomizawa et al. |
| 2016/0254732 A1* | 9/2016 | Kojima ................ B62D 5/0406 310/68 R |

FOREIGN PATENT DOCUMENTS

| | | |
|---|---|---|
| JP | 2010-288328 A | 12/2010 |
| JP | 2011-250490 A | 12/2011 |
| JP | 2012-143037 A | 7/2012 |
| JP | 2013-60119 A | 4/2013 |
| JP | 2015-144507 A | 8/2015 |

OTHER PUBLICATIONS

Japanese-language Written Opinion (PCT/ISA/237) issued in PCT Application No. PCT/JP2017/005638 dated Mar. 21, 2017 (five (5) pages).
U.S. Appl. No. 15/757,587, filed Mar. 5, 2018.
U.S. Appl. No. 15/757,102, filed Mar. 2, 2018.
U.S. Appl. No. 15/757,114, filed Mar. 2, 2018.

* cited by examiner

ELECTRIC DRIVE DEVICE AND ELECTRIC POWER STEERING DEVICE

TECHNICAL FIELD

The present invention relates to an electric drive device and an electric power steering device, and more particularly to an electric drive device and an electric power steering device in which an electronic control unit is mounted.

BACKGROUND ART

In a field of general industrial equipment, a mechanical control element is driven by an electric motor. In recent years, so-called electrically mechanically integrated electric drive device, which is configured such that an electronic control unit formed from a semiconductor element etc. controlling a rotation speed and/or a rotation torque of the electric motor is integrally mounted in the electric motor, has been used.

As an example of the electrically mechanically integrated electric drive device, for instance, an electric power steering device is configured such that a turning direction and a turning torque of a steering shaft that turns by driver's operation of a steering wheel are detected, and on the basis of these detection values, the electric motor is driven so as to rotate in the same direction as the turning direction of the steering shaft, then a steering assist torque is generated. To control this electric motor, the power steering device is provided with an electronic control unit (ECU: Electronic Control Unit).

As a related art electric power steering device, for instance,, an electric power steering device disclosed in Japanese Unexamined Patent Application Publication No. 2013-060119 (Patent Document 1) is known. Patent Document 1 discloses the electric power steering device configured by an electric motor unit and an electronic control unit. An electric motor of the electric motor unit is housed in a motor housing having a cylindrical portion that is made of aluminum alloy etc. Boards (substrates) on which electronic elements or components of the electronic control unit are mounted are housed in an ECU housing that is located on an opposite side to an output shaft of the motor housing in an axial direction of the motor housing. The boards housed in the ECU housing are provided with a power supply circuit unit, a power conversion circuit unit having a power switching element such as a MOSFET and an IGBT that drive and control the electric motor, and a control circuit unit that controls the power switching element. Output terminals of the power switching element and input terminals of the electric motor are electrically connected through a bus bar.

Power is supplied to the electronic control unit housed in the ECU housing from a power supply through a connector terminal assembly made of synthetic resin. Further, detection signals concerning an operating state etc. are sent to the electronic control unit from detection sensors. The connector terminal assembly functions as a lid member or a cover member, and is connected to the electronic control unit so as to cover an opening formed at the ECU housing. The connector terminal assembly is fixed to an outer surface of the ECO housing with fixing bolts.

As another electric drive device configured such that the electronic control unit and the electric motor unit are integrated, electric brake and an electric hydraulic pressure controller for a various kinds of hydraulic pressure control are known.

CITATION LIST

Patent Document

Patent Document 1: Japanese Unexamined Patent Application Publication No. 2013-060119

SUMMARY OF THE INVENTION

Technical Problem

Since the electric power steering device disclosed in Patent Document 1 is placed in an engine room of the vehicle, size reduction in configuration of the electric power steering device is required. In particular, there has been a tendency in recent years for various auxiliary devices such as an exhaust gas control device and a safety precaution device to be disposed in the engine room of the vehicle. It is therefore required for the auxiliary devices including the electric power steering device to be as small as possible. Further, reduction in component count of the auxiliary devices including the electric power steering device is required. From a structural viewpoint, limit of an axial length of the electric power steering device in a longitudinal direction is not strict, but there is a tendency to limit increase in size of the electric power steering device in a radial direction. Hence, size reduction of the electric drive device in the radial direction and reduction in component count are great tasks.

In the electric power steering device having a configuration disclosed in Patent Document 1, the electronic control unit formed from the power supply circuit unit, the power conversion circuit unit and the control circuit unit is mounted on two boards. Since these two boards are accommodated and arranged along the radial direction in the housing, size reduction in the radial direction is difficult. Further, nowadays, safety is particularly required of the electric power steering device to steer the vehicle, and an electronic control unit having a redundant system such as a dual-redundancy system is required. Therefore, two systems of the electronic control unit, which are the same as each other, are necessary as a configuration of the redundant system. Also from this point of view, there is a tendency for the size of the housing to further increase.

In addition, since Patent Document 1 requires the housing to accommodate therein the electronic control unit, seals to secure liquid tightness of this housing and bolts to fix the housing accommodating the electric motor and the housing accommodating the electronic control unit etc., component count is increased. Hence, including the above tasks, the electric drive device, which is capable of size reduction in the radial direction and reduction in the component count, is required.

An object of the present invention is therefore to provide a new electric drive device and a new electric power steering device which are capable of suppressing the increase in size in the radial direction of the electric drive device formed by the electric motor unit in which the electronic control unit having the redundant system is integrated, and which have a simple structure configured by as small the component count as possible.

Solution to Problem

An electric drive device comprises: a motor housing accommodating therein an electric motor that drives a mechanical control element; a heat radiation base body fixed to an end surface, which is an opposite side to an output shaft portion of a rotation shaft of the electric motor, of the motor housing and extending in a direction of the rotation shaft which is the opposite side to the output shaft portion; one electronic control unit of a redundant system, the one electronic control unit arranged along a direction in which the heat radiation base body extends and having a board that is fixed to the heat radiation base body with thermal conduction to the heat radiation base body allowed; the other electronic control unit of the redundant system, the other electronic control unit arranged along a direction in which the heat radiation base body extends and having a board that is fixed to the heat radiation base body with thermal conduction to the heat radiation base body allowed; and a cover covering the heat radiation base body and the one and the other electronic control units and liquid-tightly connected to the end surface of the motor housing without using a bolt.

Effects of Invention

According to the present invention, since the boards of the electronic control unit of the redundant system are fixed to and supported by the motor housing through the heat radiation base body, a housing to accommodate the electronic control unit is not necessary, thereby achieving the size reduction. Further, a sealing part is only a connecting portion between the motor housing and the cover. Therefore, an additional structure of the sealing part, a sealing component required for the seal and a bolt can be eliminated, thereby reducing component count.

EMBODIMENTS FOR CARRYING OUT THE INVENTION

An embodiment of the present invention will be explained in detail below with reference to the drawings. The present invention is not limited to the following embodiment, and includes all design modifications and equivalents belonging to the technical scope of the present invention.

Figure 1:
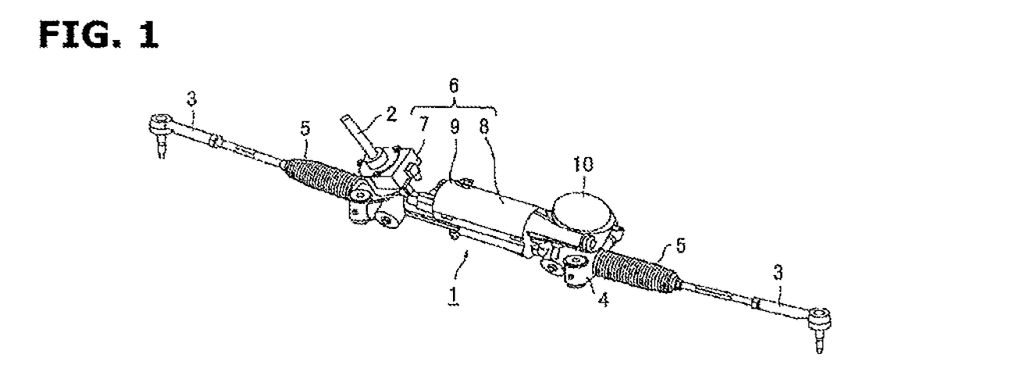
FIG. 1 is a general perspective view of a steering device as an example to which the present invention is applied.

Before explaining the embodiment of the present invention, a configuration of a steering device as an example to which the present invention is applied will be briefly explained using FIG. 1. Further, to facilitate the understanding of the present invention, a configuration of a related art electric power steering device will also be briefly explained using FIG. 2.

First, a steering device to steer front wheels of a vehicle will be explained. A steering device 1 is configured as shown in FIG. 1. A pinion (not shown) is provided at a lower end of a steering shaft 2 connecting to a steering wheel (not shown). This pinion is engaged with a rack (not shown) that extends in right and left directions of a vehicle body. A tie rod 3 to steer the front wheels in the right and left directions is each connected to both ends of the rack. The rack is accommodated in a rack housing 4. Between the rack housing 4 and each tie rod 3, a rubber boot 5 is provided.

The steering device 1 is provided with an electric power steering device 6 to assist torque when performing a turning operation of the steering wheel. That is, a torque sensor 7 that detects a turning direction and a turning torque of the steering shaft 2 is provided. And, an electric motor unit 8 that provides a steering assistive force to the rack via a gear 10 on the basis of a detection value of the torque sensor 7 is provided. Further, an electronic control device unit (ECU) 9 that controls an electric motor disposed in the electric motor unit 8 is provided. The electric motor unit 8 of the electric power steering device 6 is connected to the gear 10 at three portions of an outer periphery at an output shaft side of the electric motor unit 8 with bolts (not shown). The electronic control unit 9 is disposed on an opposite side to the output shaft side of the electric motor unit 8.

Figure 2:
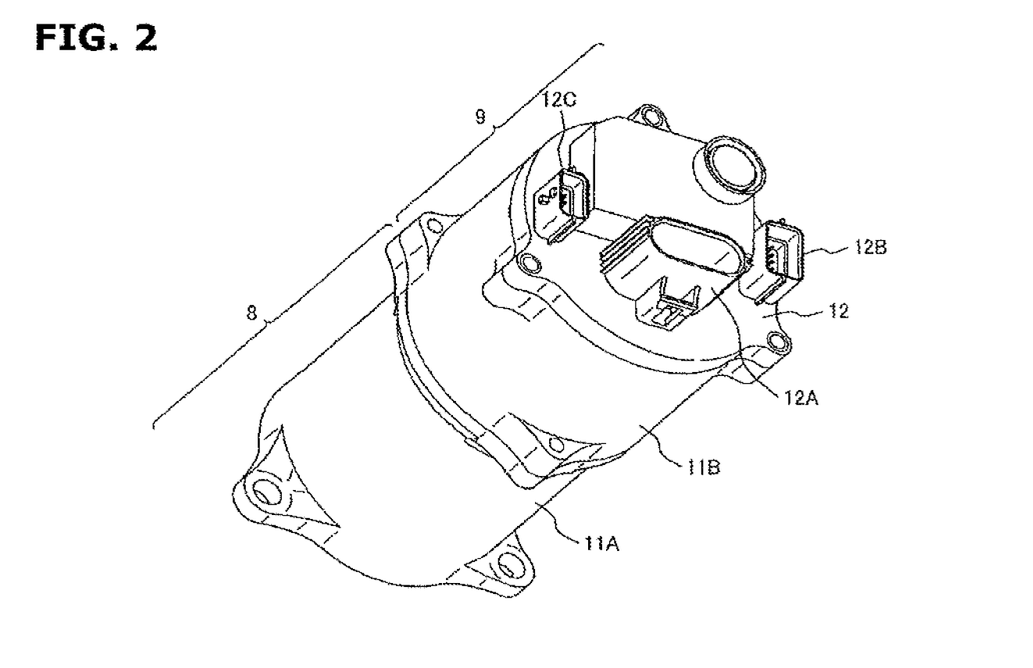
FIG. 2 is a general perspective view of a related art electric power steering device.

As shown in FIG. 2, the electric motor unit 8 of the related art electric power steering device is formed from a motor housing 11A having a cylindrical portion made of aluminum alloy etc. and the electric motor (not shown) disposed in the electric motor unit 8. The electronic control unit 9 is formed from an ECU housing 11B located on an opposite side to an output shaft of the motor housing 11A in an axial direction of the motor housing 11A and made of aluminum alloy etc. and an electronic control assembly (not shown) housed in the ECU housing 11B.

The motor housing 11A and the ECU housing 11B are fixedly connected to each other on their opposing end surfaces with fixing bolts. The electronic control assembly housed in the ECU housing 11B is configured by a power supply circuit unit that generates a required power, a power conversion circuit unit having a power switching element formed from a MOSFET or an IGBT that drives and controls the electric motor of the electric motor unit 8, and a control circuit unit that controls the power switching element. Output terminals of the power switching element and input terminals of the electric motor are electrically connected through a bus bar.

A synthetic-resin-made lid member (or cover member) 12, which is also- used as a connector terminal assembly, is fixed to an end surface of the ECU housing 11B with fixing bolts. The lid member 12 is provided with a connector terminal forming portion 12A for power supply, a connector terminal forming portion 12B for detection sensors, and a connector terminal forming portion 12C for control state output by which a control state is outputted to an external device. The electronic control assembly housed in the ECU housing 11B is supplied with power from a power supply through the connector terminal forming portion 12A for power supply of the synthetic-resin-made lid member 12. Further, the electronic control assembly is provided with detection signals of an operating condition etc. from the detection sensors through the connector terminal forming portion 12B for detection sensors. A current control state signal of the electric power steering device is outputted from the electronic control assembly through the connector terminal forming portion 12C for control state output.

Here, the lid member 12 is shaped so as to cover an entire opening of the ECU housing 11B. However, size of each of the connector terminals could be reduced, then each connector terminal could be connected to the electronic control assembly through insertion holes formed at the ECU housing 11B.

In the electric power steering device 6, when the steering shaft 2 is turned in any turning direction by the steering wheel operation, the torque sensor 7 detects the turning direction and the turning torque of the steering shaft 2. The control circuit unit calculates a drive operation amount of the electric motor on the basis of these detection values. The electric motor is then driven by the power switching element of the power conversion circuit unit on the basis of the calculated drive operation amount. And, an output shaft of the electric motor rotates so as to drive and rotate the steering shaft 2 in the same direction as a direction of the steering wheel operation. This rotation of the output shaft of the electric motor is transmitted to the rack (not shown) through the pinion (not shown) and the gear 10, and the vehicle is steered. Since such configuration and workings are well known, a further explanation will be omitted here.

In such electric power steering device, as mentioned above, there has been a tendency in recent years for various auxiliary devices such as the exhaust gas control device and the safety precaution device to be disposed in the engine room of the vehicle. It is therefore required for the auxiliary devices including the electric power steering device to be as small as possible. From a structural viewpoint, limit of an axial length of the electric power steering device in a longitudinal direction is not strict, but there is a tendency to limit increase in size of the electric power steering device in a radial direction. Hence, size reduction of the electric drive device in the radial direction and reduction in component count are great tasks.

In the electric power steering device having such configuration, the electronic control unit formed from the power supply circuit unit, the power conversion circuit unit and the control circuit unit is mounted on two boards. Since these two boards are accommodated and arranged along the radial direction in the housing, size reduction in the radial direction is difficult. Further, nowadays, safety is particularly required of the electric power steering device to steer the vehicle, and an electronic control unit having a redundant system such as a dual-redundancy system is required. Therefore, two systems of the electronic control unit, which are the same as each other, are necessary as a configuration improving the redundant system. Also from this point of view, there is a tendency for the size of the housing to further increase.

In addition, since the housing to accommodate therein the electronic control unit, seals to secure liquid tightness of this housing and bolts to fix the housing accommodating the electric motor and the housing accommodating the electronic control unit etc. are necessary, component count is increased. Hence, including the above-mentioned tasks, the electric drive device, which is capable of size reduction in the radial direction and reduction in the component count, is required.

From such background, the present embodiment proposes the electric power steering device having the following configuration.

That is, in the present embodiment, a heat radiation base body that extends in a direction of a rotation shaft of an electric motor close to the rotation shaft of the electric motor is provided at an end surface of a motor housing accommodating therein the electric motor. And, a board of one electronic control unit of the redundant system is fixed to the heat radiation base body along a direction in which the heat radiation base body extends with thermal conduction between the board and the heat radiation base body allowed or secured. Further, a board of the other electronic control unit of the redundant system is fixed to the heat radiation base body along the direction in which the heat radiation base body extends, so as to face to the board of the one electronic control unit of the redundant system, with thermal conduction between the board and the heat radiation base body allowed or secured. Furthermore, a cover that covers these heat radiation base body and the boards is liquid-tightly fixed to the end surface of the motor housing without using a bolt.

Figure 3:
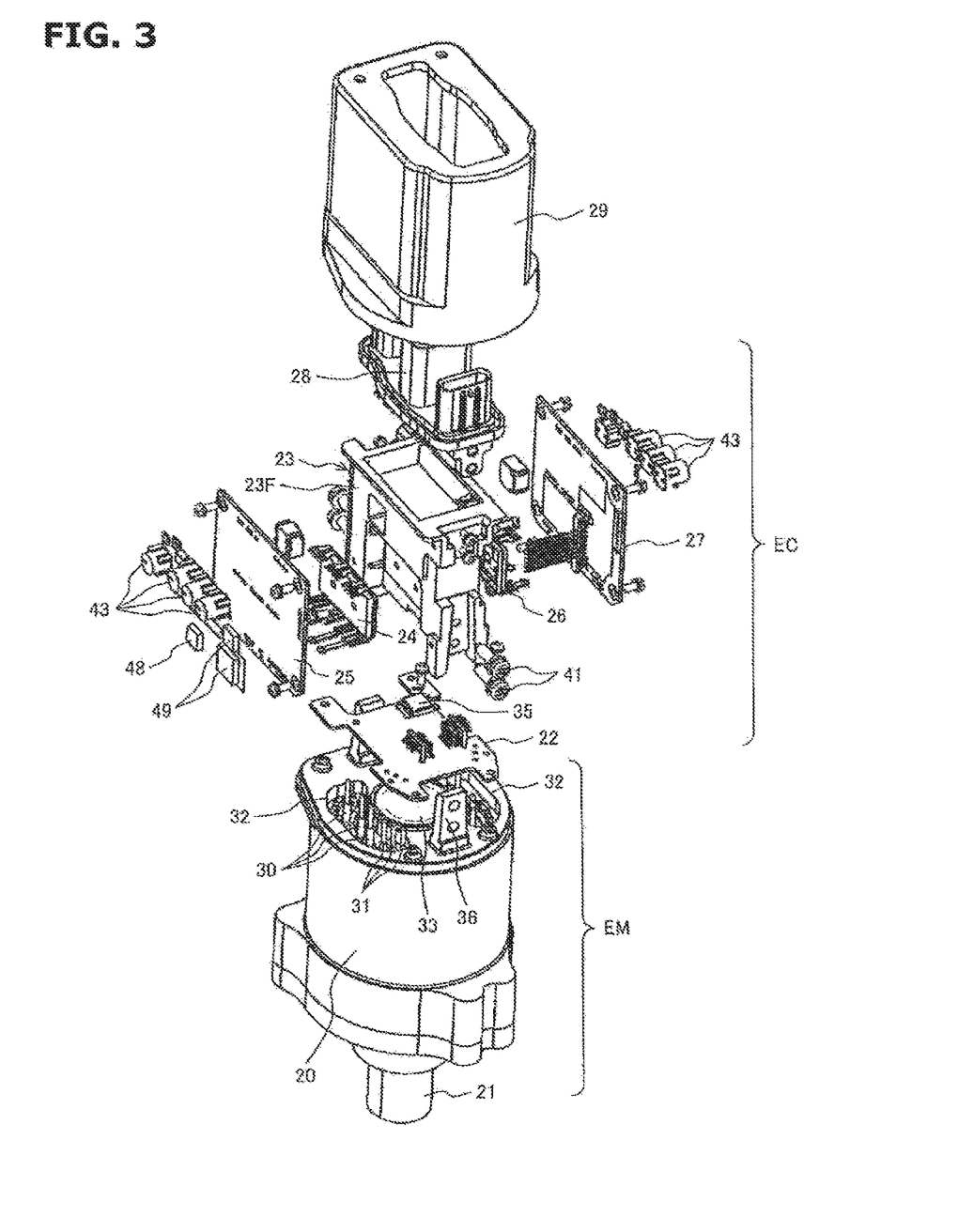
FIG. 3 is a perspective exploded view of an electric power steering device according to an embodiment of the present invention.

In the following description, a configuration of the electric power steering device according to the embodiment of the present invention will be explained in detail with reference to FIGS. 3 to 9. FIG. 3 is a drawing, viewed from an oblique direction, with components of the electric power steering device of the embodiment dismantled. FIGS. 4 to 9 are drawings showing each assembly state of the components of the electric power steering device when assembled in assembly order. The explanation will be made with reference to each drawing as necessary.

FIG. 3 is a perspective exploded view of the electric power steering device 6. An iron-made annular side yoke (not shown) is fitted to an inside of a motor housing 20. The electric motor is accommodated inside this side yoke. An output shaft portion 21 of the electric motor provides the steering assistive force to the rack via the gear. Since a specific structure of the electric motor is well known, its explanation will be omitted here.

The motor housing 20 is made of aluminum alloy, and acts as a heat sink that radiates heat generated at the electric motor and heat generated in electronic elements or components mounted on after-mentioned electronic control boards to the outside atmosphere. The electric motor and the motor housing 20 form an electric motor unit EM.

An electronic control unit EC is connected to an end surface of the motor housing 20 which is opposite side of the output shaft portion 21 of the electric motor unit EM. The electronic control unit EC is formed from a rotation position detection circuit board 22, a heat radiation base body 23, a first power conversion circuit board 24, a first control circuit board 25, a second power conversion circuit board 26, a second control circuit board 27, and a power supply connector 28.

Here, the first power conversion circuit board 24, the first control circuit board 25, the second power conversion circuit board 26 and the second control circuit board 27 form a redundant system. A main electronic control means (a main electronic control unit) is formed by the first power conversion circuit board 24 and the first control circuit board 25. A sub-electronic control means (a sub-electronic control unit) is formed by the second power conversion circuit board 26 and the second control circuit board 27.

In a normal condition, the electric motor is driven and controlled by the main electronic control unit. However, if an abnormal condition or a failure occurs to the first power conversion circuit board 24 or the first control circuit board 25 of the main electronic control unit, the control is switched to the sub-electronic control unit, and the electric motor is driven and controlled by the second power conversion circuit board 26 and the second control circuit board 27 of the sub-electronic control unit.

Therefore, normally, heat from the main electronic control unit is transmitted to the heat radiation base body 23. If the abnormal condition or the failure occurs to the main electronic control unit, the main electronic control unit stops and the sub-electronic control unit operates, then heat from the sub-electronic control unit is transmitted to the heat radiation base body 23. These will be described later.

However, both of the main electronic control unit and the sub-electronic control unit could operate as a regular electronic control unit, although the present invention does not apply this configuration. And, if the abnormal condition or the failure occurs to one of the electronic control units, the other electronic control unit drives and controls the electric motor by half ability. In this case, although capability of the electric motor is half, so-called limp-home function is secured. Therefore, in the normal condition, heat from the main electronic control unit and the sub-electronic control unit is transmitted to the heat radiation base body 23.

The electronic control unit EC is not housed in the ECU housing of the related art as shown in FIG. 2. Therefore, heat of the electronic control unit EC does not radiate from the ECU housing. In the present embodiment, the electronic control unit EC is configured to be secured to and supported by the motor housing 20. And, heat of the electronic control unit EC radiates mainly from the motor housing 20. When completing assembling the electronic control unit EC and the electric motor unit EM, the electronic control unit EC is covered by a cover 29. The cover 29 and the motor housing 20 are connected to each other with the cover 29 facing to the end surface of the motor housing 20.

The cover 29 is made of metal. The cover 29 is fixedly connected to the motor housing 20 by welding (seizing). In this manner, in the present embodiment, in the electric power steering device, a sealing part is only a connecting portion between the motor housing 20 and the cover 29. Therefore, an additional structure of the sealing part, a sealing component required for the seal and a bolt can be eliminated.

Further, since it is not necessary for the cover 29 to support the electronic control unit EC, a thickness of the cover 29 can be thin, which contributes to size reduction of the control unit EC in the radial direction and weight reduction of the control unit EC. If the cover 29 is made of metal (e.g. aluminum alloy or iron), the cover 29 has a heat radiation function. Therefore, heat from the motor housing 20 is transmitted to the cover 29, then a heat radiation effect is further improved.

As described above, in the present embodiment, the rotation position detection circuit board 22 is fixed to the end surface of the motor housing 20. The first power conversion circuit board 24, the first control circuit board 25, the second power conversion circuit board 26 and the second control circuit board 27 are fixed to the heat radiation base body 23 with these boards facing to each other. Further, the heat radiation base body 23 is fixed to the end surface of the motor housing 20 so as to cover the rotation position detection circuit board 22. Furthermore, the cover 29 and the motor housing 20 are configured such that the cover 29 is liquid-tightly welded to the end surface of the motor housing 20 and a weld-connecting part is formed between the cover 29 and the motor housing 20. This configuration is one of outstanding features of the present embodiment.

That is, the present embodiment does not require the ECU housing like the electric power steering device of the related art as shown in FIG. 2, which is located on the opposite side to the output shaft of the motor housing in the axial direction of the motor housing and is made of aluminum alloy etc.

Consequently, the ECU housing like the related art, a seal to secure liquid tightness of the ECU housing and a bolt to fix the motor housing and the ECU housing are not necessary in the present embodiment. It is therefore possible to reduce a whole foody size of the electric power steering device. Further, component count can be reduced, thereby reducing man-hour of assembly or assembly processes. With this, a final product piece rate (or a final product unit price) can be suppressed, and this gives rise to improvement in product-competitiveness.

Returning to FIG. 3, a rotor portion (not shown) of the electric motor is disposed in a middle portion of the motor housing 20. A stator winding is wound around this rotor portion. The stator winding is connected by star connection. An input terminal 30 of the winding of each phase and a neutral terminal 31 of each phase, for one of the redundant system, protrude from an opening 32 that is formed at the motor housing 20. In the present embodiment, since the redundant system is configured, for the other of the redundant system, other input terminal 30 of the winding of each phase and other neutral terminal 31 of each phase protrude from an opening 32 formed at the motor housing 20. These input terminals 30 and neutral terminals 31 protrude from the openings 32 with the terminals 30 and 31 for one of the redundant system and the terminals 30 and 31 for the other of the redundant system arranged at 180° angular space.

The input terminal 30 of the winding is connected to an output terminal of the first power conversion circuit board 24 forming the main electronic control unit for each phase. The neutral terminal 31 for each phase is connected to the rotation position detection circuit board 22 through a wiring pattern on the wiring board 22, and forms a neutral point. Likewise, for the other of the redundant system, the input terminal 30 of the winding is connected to an output terminal of the second power conversion circuit board 26 forming the sub-electronic control unit for each phase. Also, for the other of the redundant system, the neutral terminal 31 for each phase is connected to the rotation position detection circuit board 22 through the wiring pattern on the wiring board 22, and forms the neutral point. These configurations are basically almost the same because of the redundant system.

These configurations are also one of the outstanding features of the present embodiment. Since the neutral terminals 31 of the main electronic control unit and the sub-electronic control unit for each phase are connected to the rotation position detection circuit board 22 through the wiring pattern on the wiring board 22 in this manner, no complicated wiring route of the neutral terminals 31 is required, then a wiring structure is extremely simple. In addition, since complicated wiring route of the input terminals 30 to the respective power conversion circuit boards 24 and 26 is not required, a space for this complicated wiring route is also not required. Size reduction of the electronic control unit EC can therefore be achieved. This will be explained using FIG. 8.

Here, a bearing that supports a rotation shaft forming the rotor portion is provided between the two openings 32 of the motor housing 20, although this is not illustrated in the drawing. A sealing plate 33 is provided at the end surface side of the motor housing 20 so as to cover this bearing portion from the outer side. The sealing plate 33 is a plate that shields the rotor portion from the outside, and is provided so that after the cover 29 is fixed, a filler that fills an inside of the cover 29 does not enter the rotor portion. Here, although the filler flows to the winding side through the opening 32, since the windings do not rotate, this produces no ill effect.

Figure 4:
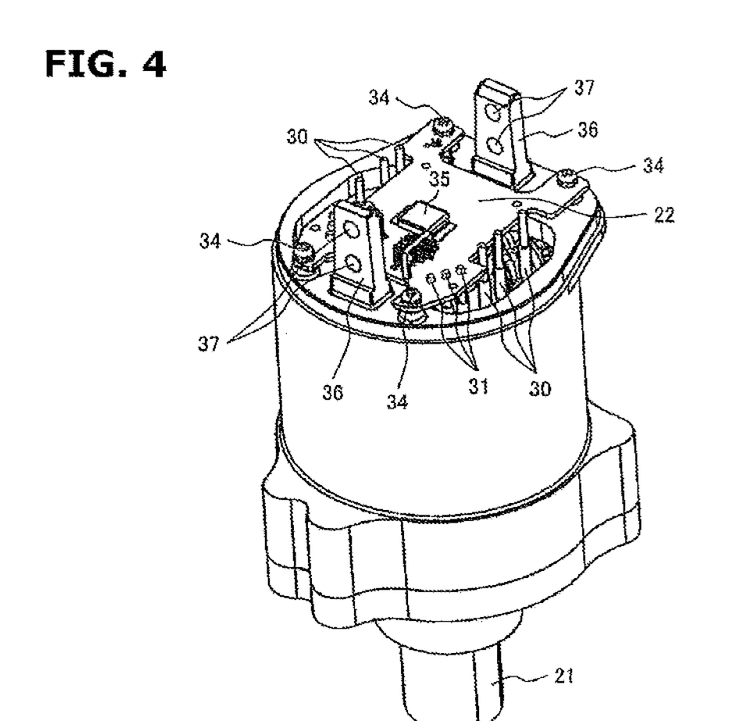
FIG. 4 is a perspective view showing a state in which a rotation angle detection board is mounted in an electric motor unit.

As shown in FIGS. 3 and 4, the rotation position detection circuit board 22 is fixed to the end surface of the motor housing 20 with bolts 34. The neutral terminal 31 for each phase is connected to this rotation position detection circuit board 22 through the wiring pattern on the wiring board 22, and then forms the neutral point. Further, the input terminal 30 of the winding for each phase extends along an axial direction from a gap between the opening 32 and the rotation position detection circuit board 22. As described later, the input terminals 30 are connected to the output terminals of the respective power conversion circuit boards 24 and 26 for each phase.

A GMR (Giant Magneto Resistance effect) element (not shown) is provided on a surface, at the sealing plate 33 side, of the rotation position detection circuit board 22. The GMR element is configured to obtain magnetic pole position information of the rotor portion in cooperation with a position detection permanent magnet that is fixed to a rotation shaft located at an opposite side to the output shaft portion 21. Further, a magnetic shield plate 35 is provided on a surface opposite to the surface on which the GMR element of the rotation position detection circuit board 22 is provided.

This magnetic shield plate 35 has the function of suppressing an influence of magnetism on the GMR element, which is caused by operation of the electronic elements or components mounted on the first power conversion circuit board 24, the first control circuit board 25, the second power conversion circuit board 26 and the second control circuit board 27.

Supporting stems 36 that stand on the end surface of the motor housing 20 toward an opposite side to the output shaft portion 21 in the axial direction are formed integrally with the motor housing 20. Therefore, the supporting stem 36 is made of aluminum alloy, and its thermal conductivity is high. The supporting stems 36 are arranged at 180° angular space on opposite sides of the rotation position detection circuit board 22. As described later, the supporting stems 36 have the function of not only fixing and supporting the heat radiation base body 23 but also transmitting heat from the heat radiation base body 23 to the motor housing 20.

The supporting stems 36 are formed into a shape that thermally touches or contacts the heat radiation base body 23 at three surfaces of the supporting stem 36 which are a front surface and side surfaces formed at both sides of the front surface of the supporting stem 36. Then, in order to increase a thermal conductive area of the supporting stem 36, the side surfaces of the supporting stem 36 are shaped into an oblique surface that obliquely extends toward an axial direction tip end. With this shape, a length of the side surface of the supporting stem 36 is longer, and a large thermal conductive area can be secured. On the front surface and a back surface of the supporting stem 36, insertion holes into which fixing bolt is inserted are formed.

Figure 5:
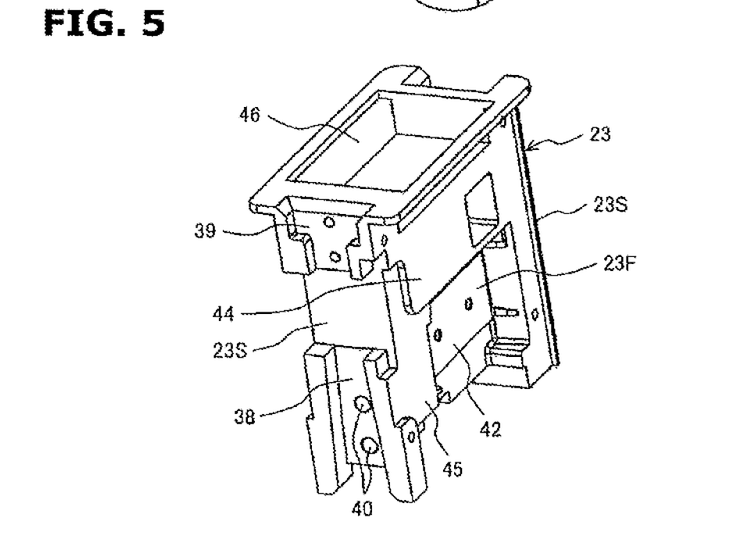
FIG. 5 is a perspective view of a heat radiation base body secured to the electric motor unit.
Figure 6:
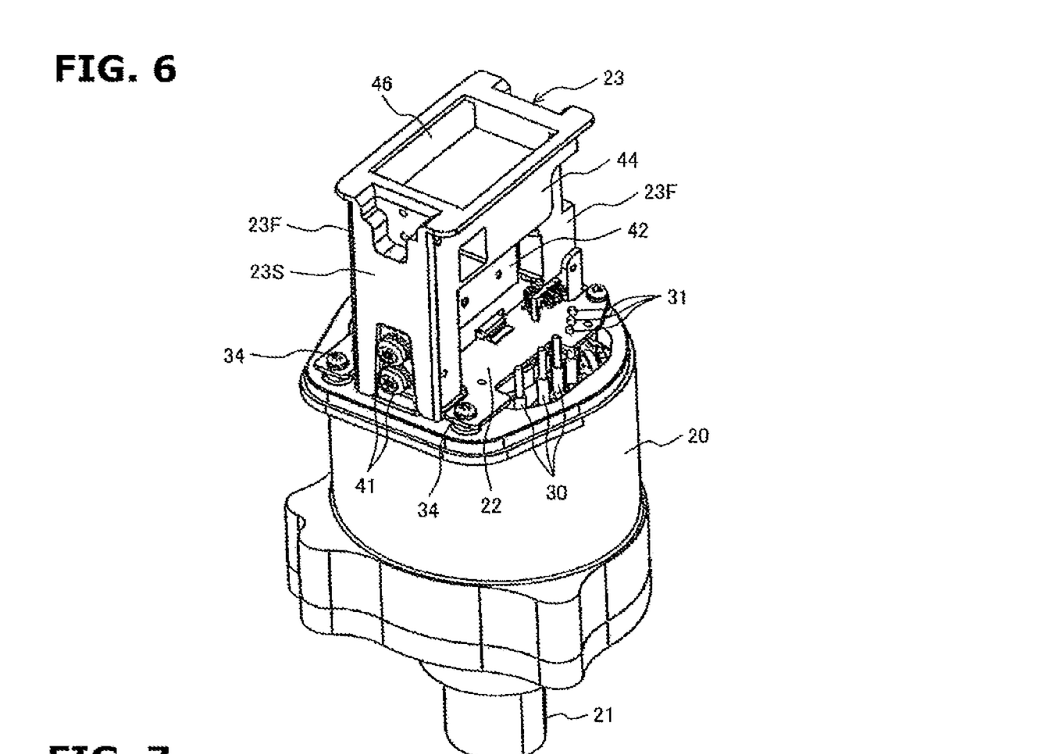
FIG. 6 is a perspective view showing a state in which the heat radiation base body is mounted on the electric motor unit.

In FIGS. 3, 5 and 6, the heat radiation base body 23 is made of aluminum alloy having a good thermal conductivity, and is formed into a substantially rectangular parallelepiped. Basically, the heat radiation base body 23 is placed in a substantially middle on the end surface of the motor housing 20. In other words, the heat radiation base body 23 is disposed on the motor housing 20 so as to pass through an area on an extension line of the rotation shaft of the rotor portion and so as to extend toward an opposite side to the output shaft portion 21 in the axial direction. The after-mentioned electronic control boards of the redundant system are arranged in the axial direction with this heat radiation base body 23 being a center or a middle. This configuration is also one of the outstanding features of the present embodiment.

At a lower side of each of both side surfaces 23S of the heat radiation base body 23, a supporting stem fixing portion 38 to which the supporting stem 36 is fixed is formed. At an upper side of each of the both side surfaces 23S, a connector fixing portion 39 is formed. The supporting stem fixing portion 38 is formed into a recessed shape having a surface that faces to the front surface of the supporting stem 36 and surfaces that face to the respective side surfaces of the supporting stem 36. The supporting stem 36 is accommodated and fitted in this recessed-shaped portion. On the surface of the supporting stem fixing portion 38 which faces to the front surface of the supporting stem 36, bolt insertion holes 40 into which the fixing bolt is screwed are formed.

The surfaces of the supporting stem fixing portion 38 which face to the respective side surfaces of the supporting stem 36 are formed into oblique surfaces so as to narrow toward an upper side in line with the oblique supporting stem 36. With this shape, a large thermal conductive area of heat transmitted from the heat radiation base body 23 toward the supporting stem 36 can be secured. In addition, this shape can act as a guide when inserting or fitting the heat radiation base body 23 (the supporting stem fixing portions 38) onto or to the supporting stem 36.

Further, since the side surfaces of the supporting stem 36 and the surfaces of the supporting stem fixing portion 38 which face to these side surfaces of the supporting stem 36 are the oblique surfaces, the respective opposing surfaces are closely fitted, then play or vibration between the supporting stem 36 and the heat radiation base body 23 can be suppressed. It is therefore possible to suppress unnecessary vibration of the heat radiation base body 23.

The connector fixing portion 39 provided at the upper side of the heat radiation base body 23 is formed into a shape to which the power supply connector 28 is fitted. This will be explained using FIG. 8.

FIG. 6 shows an assembly state of the heat radiation base body 23, viewed from an opposite side to the side surface 23S of the heat radiation base body 23 shown in FIG. 5.

As shown in FIG. 6, the supporting stem fixing portions 38 of the heat radiation base body 23 is moved downward along the supporting stem 36 formed at the motor housing 20. Then, when the supporting stem fixing portions 38 reaches a predetermined position, the supporting stem 36 and the heat radiation base body 23 are firmly fixed with the fixing bolts 41. In this state, the heat radiation base body 23 is secured on the end surface of the motor housing 20 at the substantially middle position on the end surface of the motor housing 20. Here, in the present embodiment, since a length of a fixing surface of the heat radiation base body 23 fixed to the end surface of the motor housing 20 is made substantially identical to sizes of the after-mentioned control circuit boards 25 and 27, the heat radiation base body 23 is fixed so as to cross the middle of the end surface of the motor housing 20.

Then, with this structure, it is possible to transmit heat from the after-mentioned electronic control boards to the heat radiation base body 23 and further transmit heat of the heat radiation base body 23 to the supporting stem 36. Hence, since heat from the electronic control boards can radiate from the motor housing 20 without using the conventional ECO housing of the related art, it is possible to reduce the whole body size of the electric power steering device. Further, component count can be reduced, thereby reducing man-hour of assembly or assembly processes.

Here, regarding a contact portion between the supporting stem 36 and the heat radiation base body 23, in order to increase thermal contact (in order to decrease an interfacial thermal resistance), a heat radiation function member such as an adhesive having good thermal conductivity, a heat radiation sheet and a heat radiation grease could be interposed between the supporting stem 36 and the heat radiation base body 23.

Figure 8:
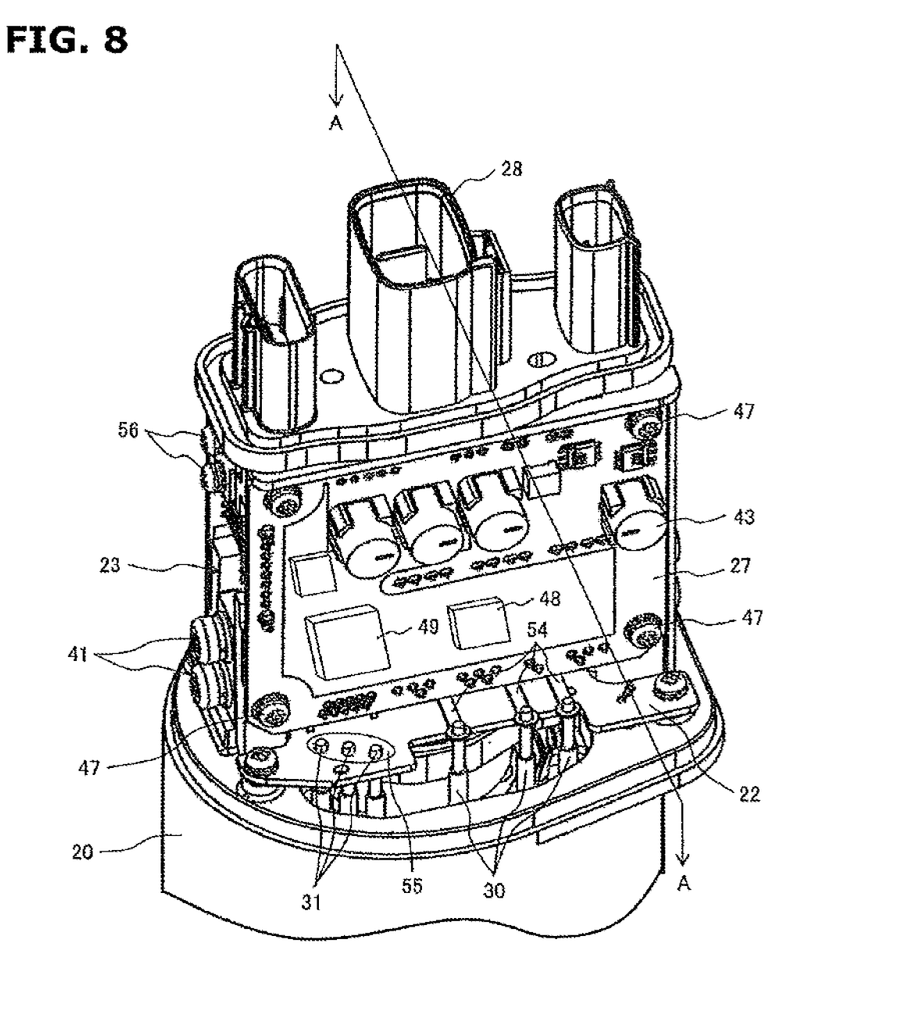
FIG. 8 is a perspective view showing a state in which an electronic control means (an electronic control unit) having a redundant system is fixed to the heat radiation base body.

Returning to FIG. 5, on a board fixing surface 23F corresponding to a front surface side of the heat radiation base body 23, a fixing surface where the first power conversion circuit board 24 and the first control circuit board 25 are fixed is formed. As shown in FIGS. 3 and 8, the first power conversion circuit board 24 is fixed on the front surface side of the heat radiation base body 23, and the first control circuit board 25 is fixed from an outer side of the first power conversion circuit board 24.

Likewise, on a board fixing surface 23F corresponding to a back surface side of the heat radiation base body 23, a fixing surface where the second power conversion circuit board 26 and the second control circuit board 27 are fixed is formed. As shown in FIG. 3, the second power conversion circuit board 26 is fixed on the back surface side of the heat radiation base body 23, and the second control circuit board 27 is fixed from an outer side of the second power conversion circuit board 26.

The first power conversion circuit board 24 and the second power conversion circuit board 26 are each provided, on metal substrates thereof made of metal such as aluminium having a good thermal conductivity, with a power switching element configured from a plurality of MOSFETs which forms a power conversion circuit and an output connector for output of this power switching element. Further, the first power conversion circuit board 24 and the second power conversion circuit board 26 are each provided with coil s forming a power supply circuit, switching elements configured from MOSFETs, and various connector terminals. Since a large number of switching elements, each of which carries out the switching of a large current, are mounted on these first power conversion circuit board 24 and second power conversion circuit board 26, a heat value of each of the first power conversion circuit board 24 and the second power conversion circuit board 26 is high. The first power conversion circuit board 24 and the second power conversion circuit board 26 are therefore main heat generation sources. Although heat is generated also from the first control circuit board 25 and the second control circuit board 27, this heat is transmitted to the heat radiation base body 23, and radiates from the heat radiation base body 23. This will be described later.

The metal substrates of these first power conversion circuit board 24 and second power conversion circuit board 26 are fixed to accommodation recessed portions 42 formed on the front and back surfaces of the heat radiation base body 23, as shown in FIGS. 5 and 6, with fixing bolts. The power switching element is positioned between the metal substrate and the accommodation recessed portion 42. In order to improve thermal conductive performance, a heat radiation function member such as an adhesive having good thermal conductivity, a heat radiation sheet and a heat radiation grease is interposed between the power switching element and the accommodation recessed portion 42.

Here, needless to say, it is possible to employ a configuration in which the metal substrate contacts the accommodation recessed portion 42 with the power switching element positioned at an opposite side to the accommodation recessed portion 42. However, in the present embodiment, in order to efficiently transmit heat of the power switching element to the heat radiation base body 23, the configuration in which the power switching element contacts the accommodation recessed portion 42 is employed.

In this manner, by employing the configuration in which the first power conversion circuit board 24 and the second power conversion circuit board 26 are accommodated in the respective accommodation recessed portions 42 formed at the heat radiation base body 23, in the present embodiment, the first power conversion circuit board 24 and the second power conversion circuit board 26 are accommodated in the heat radiation base body 23, thereby suppressing the increase in size in the radial direction of the electronic control unit EC.

Further, as shown in FIG. 3, the first control circuit board 25 and the second control circuit board 27 are fixed to the respective board fixing surfaces 23F of the heat radiation base body 23 so as to cover the first power conversion circuit board 24 and the second power conversion circuit board 26 with fixing bolts 47. That is, each of the first control circuit board 25 and the second control circuit board 27 is fixed to a fixing flat surface portion 44 that encloses the accommodation recessed portion 42 formed on the board fixing surface 23F of the heat radiation base body 23 with the fixing bolts 47.

A microcomputer 48 that controls the switching elements of the power conversion circuit and its peripheral device 49 are mounted on a resin board, made of synthetic resin etc., of each of the first control circuit board 25 and the second control circuit board 27. In the present embodiment, an electrolytic capacitor 43 that forms the power supply circuit is mounted on each of the first control circuit board 25 and the second control circuit board 27.

Since a body size of the electrolytic capacitor 43 is large, it is difficult for the electrolytic capacitor 43 to be accommodated in the accommodation recessed portion 42. Therefore, the electrolytic capacitor 43 is mounted on each of the first control circuit board 25 and the second control circuit board 27. Since a space from the cover 29 sufficiently exists as shown in FIG. 3, even though the electrolytic capacitors 43 are arranged, this produces no ill effect.

Here, between the accommodation recessed portion 42 and the fixing flat surface portion 44, a passage space 45 that becomes a passage when the first control circuit board 25 and the second control circuit board 27 are fixed to the heat radiation base body 23 is formed. This passage space 45 is formed to cool the accommodation recessed portion 42 by the air. Therefore, heat from the first control circuit board 25 and the second control circuit board 27 flows or is transmitted to the air in the passage space 45, and also transmitted to the heat radiation base body 23 through the fixing flat surface portion 44.

As shown in FIG. 5, a connector accommodation recessed portion 46 is formed on an upper end surface of the heat radiation base body 23 at an opposite side to a fixing side of the heat radiation base body 23. This connector accommodation recessed portion 46 accommodates therein an inner side end of the power supply connector 28, and has the function of making positioning of the power supply connector 28.

Figure 7:
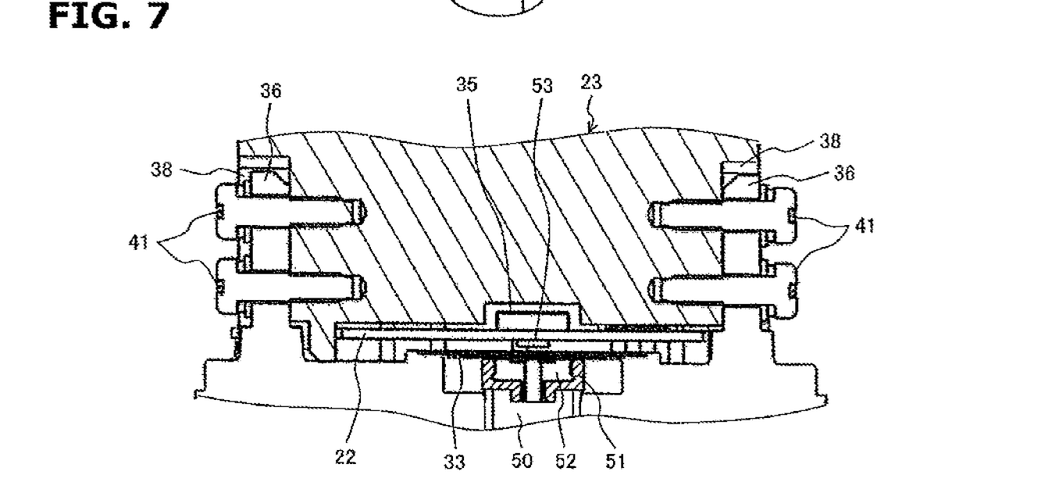
FIG. 7 is a cross section for explaining a fixing way of the electric motor unit and the heat radiation base body.

FIG. 7 is a cross section for explaining a fixing state of the supporting stem 36 and the heat radiation base body 23. An end portion of a rotation shaft 50, which is an opposite side to the output shaft portion 21, is positioned on the end surface of the motor housing 20. A magnet retaining member 51 is fixed to this end portion of the rotation shaft 50. The magnet retaining member 51 accommodates therein the position detection permanent magnet 52 that forms a position detection sensor. This position detection permanent magnet 52 is polarized so that a plurality of unit magnets are arranged annularly.

The sealing plate 33 is disposed between the position detection permanent magnet 52 and the rotation position detection circuit board 22. This sealing plate 33 is secured to the end surface of the motor housing 20, and shields a space in which the rotation shaft 50 is disposed from a space located at the rotation position detection circuit board 22 side. With this, the space in which the rotation shaft 50 is disposed can be shielded liquid-tightly or hermetically from the rotation position detection circuit board 22 side space.

Therefore, water or moisture coming through the rotation shaft 50 is blocked from moving to or entering a space in which the electronic control boards are arranged, thereby suppressing ill effect on the electronic elements or components mounted on the electronic control boards due to the water or moisture. As a matter of course, dust or particles generated by rotation of the electric motor can be blocked from entering. This gives rise to an effect of preventing failure of the electronic elements or components.

Here, a sensor that senses the water or moisture could be provided on the rotation position detection circuit board 22, then senses the entering of the water or moisture. In the present embodiment, since the connecting portion is formed only at a facing surface between the motor housing 20 and the cover 29, it is conceivable that the water or moisture will enter inside from this connecting portion. Since the rotation position detection circuit board 22 is fixed close to the end surface of the motor housing 20, if the sensor sensing the water or moisture is disposed on the rotation position detection circuit board 22, it is possible to sense the water or moisture earliest.

The GMR element 53 is mounted on the surface, at the position detection permanent magnet 52 side, of the rotation position detection circuit board 22, and arranged at a position facing to the position detection permanent magnet 52. Therefore, the GMR element 53 is fixedly connected to the motor housing 20. That is, the rotation shaft 50 to which the position detection permanent magnet 52 is fixed is supported by the end surface of the motor housing 20, and the rotation position detection circuit board 22 on which the GMR element 53 is mounted is also fixed to the end surface of the motor housing 20. Because of this, since positions of the position detection permanent magnet 52 and the rotation position detection circuit board 22 are determined on the end surface of the motor housing 20, accuracy of assembly of the GMR element 53 can be improved, and a precise detection signal can be obtained.

In FIG. 7, in a state in which the supporting stem fixing portions 38 of the heat radiation base body 23 are moved to and fitted onto the respective supporting stems 36, the fixing bolts 41 are screwed into the heat radiation base body 23 from a radially outer side to a radially inner side through the supporting stems 36, and the supporting stems 36 and the heat radiation base body 23 are firmly fixed with the fixing bolts 41.

This fixing direction of the fixing bolt 41 is also one of the outstanding features of the present embodiment. In the present embodiment, the fixing bolts 41 are screwed into the heat radiation base body 23 from the radially outer side to the radially inner side through the supporting stems 36. With this, size reduction of the of the control unit EC can be realized. As this kind of fixing manner, there is known a fixing manner in which a fixing flange is formed at an outer periphery of the heat radiation base body 23, and this fixing flange is fixed to an outer periphery of the motor housing 20 with fixing bolts. However, when the heat radiation base body 23 and the motor housing 20 are fixed at their outer peripheral sides, the size tends to increase in the radial direction by an amount of the fixing of the outer peripheral sides.

In contrast to this, the present embodiment utilizes the space formed by the heat radiation base body 23 and the cover 29, and the fixing bolts 41 are positioned in this space. Therefore, since the fixing bolts 41 are screwed into the heat radiation base body 23 from the radially outer side to the radially inner side through the supporting stems 36, the heat radiation base body 23 and the motor housing 20 are not fixed at their outer peripheral sides. With this, size reduction of the of the control unit EC can be realized.

Further, the two supporting stems 36 at the motor housing 20 are cantilevers. Therefore, when fixing the heat radiation base body 23 and the supporting stem 36 with the fixing bolt 41, the supporting stem 36 is fixed with a slight flexure given to the supporting stem 36. Since a load in an axial direction always acts on a screw thread of the fixing bolt 41 by this slight flexure, the fixing bolt 41 can be prevented from loosening.

After the heat radiation base body 23 is fixed to the motor housing 20, subsequently, the electronic control boards of the redundant system are fixed.

In FIG. 8, the metal substrates of the first power conversion circuit board 24 and the second power conversion circuit board 26 are fixed to the accommodation recessed portions 42 formed on the front and back surfaces of the heat radiation base body 23 with fixing bolts. In this FIG. 8, since the first control circuit board 25 and the second control circuit board 27 are assembled, the first-power conversion circuit board 24 and the second power conversion circuit board 26 are not illustrated. By employing the configuration in which the first power conversion circuit board 24 and the second power conversion circuit board 26 are accommodated in the respective accommodation recessed portions 42 formed at the heat radiation base body 23, in the present embodiment, the first power conversion circuit board 24 and the second power conversion circuit board 26 are accommodated in the heat radiation base body 23, thereby suppressing the increase in size in the radial direction of the electronic control unit EC.

Further, the first control circuit board 25 and the second control circuit board 27 are fixed to the respective board fixing surfaces 23F of the heat radiation base body 23 so as to cover the first power conversion circuit board 24 and the second power conversion circuit board 26 with the fixing bolts 47. The electrolytic capacitor 43 used for the power supply circuit, the microcomputer 48 controlling the switching elements of the power conversion circuit and its peripheral device 49 are mounted on each of the first control circuit board 25 and the second control circuit board 27.

The power supply connector 28 is connected to the upper end surface of the heat radiation base body 23, and fixed at the connector fixing portions 39 shown in FIG. 5 with fixing bolts 56. The power supply connector 28 is connected to a vehicle-mounted battery (not shown) through a cable (not shown). Therefore, power supplied from the power supply connector 28 is supplied to the first power conversion circuit board 24, the first control circuit board 25, the second power conversion circuit board 26 and the second control circuit board 27, and further supplied to the electric motor, then the electric motor is driven. Subsequently, the cover 29 is fixed to the end surface of the motor housing 20 so as to seal the electronic control unit EC.

As explained above, the first power conversion circuit board 24 and the first control circuit board 25 are provided on the front surface of the heat radiation base body 23, and the second power conversion circuit board 26 and the second control circuit board 27 are provided on the back surface of the heat radiation base body 23. Therefore, in the normal condition, a part of the heat generated in an operating condition of the first power conversion circuit board 24 and the first control circuit board 25 is stored (or accumulated) in the second power conversion circuit board 26 and the second control circuit board 27 through the heat radiation base body 23. It is thus possible to remove the heat of the first power conversion circuit board 24 and the first control circuit board 25 rapidly and efficiently. As a matter of course, needless to say, most of the heat, except this heat, radiates from the motor housing 20 through the heat radiation base body 23.

Further, an output terminal 54 for each phase of each of the first power conversion circuit board 24 and the second power conversion circuit board 26 protrudes from an upper surface of the rotation position detection circuit board 22 to the radially outer side. The output terminals 54 are connected to the input terminals 30 of the winding for the respective phases. Since the input terminals 30 of the winding, protruding from the openings 32, are directly connected to the output terminals 54 for the respective phases around the openings 32 without requiring complicated wiring route in this manner, an unnecessary space for this complicated wiring route is not required. Size reduction of the electronic control unit EC can therefore be achieved.

Further, the neutral terminal 31 for each phase is connected to the rotation position detection circuit board 22 through the wiring pattern on the wiring board 22, and forms the neutral point. Likewise, for the other of the redundant system, the neutral terminal 31 for each phase is connected to the rotation position detection circuit board 22 through the wiring pattern on the wiring board 22, and forms the neutral point. Since the neutral terminals 31 of the main electronic control unit and the sub-electronic control unit for each phase are connected to the rotation position detection circuit board 22 through the wiring pattern 55 on the wiring board 22 in this manner, no complicated wiring route of the neutral terminals 31 is required, then the wiring structure is extremely simple. In addition, since complicated wiring route of the input terminals 30 to the respective power conversion circuit boards 24 and 26 is not required, a space for this complicated wiring route is also not required. Size reduction of the electronic control unit EC can therefore be achieved.

Furthermore, in the electronic control unit EC assembled as described above, in particular, a part of the heat generated in the first power conversion circuit board 24 (or the second power conversion circuit board 26) is stored (or accumulated) in the second power conversion circuit board 26 (or the first power conversion circuit board 24) through the heat radiation base body 23, and most of the heat transmitted to the heat radiation base body 23 is transmitted to the motor housing 20 through the supporting stems 36 and radiates from the motor housing 20.

In the configuration explained above, the fixing surface where the first power conversion circuit board 24 and the first control circuit board 25 are fixed is formed on the board fixing surface 23F corresponding to the front surface side of the heat radiation base body 23. The fixing surface where the second power conversion circuit board 26 and the second control circuit board 27 are fixed is formed on the board fixing surface 23F corresponding to the back surface side of the heat radiation base body 23. Then, the board fixing surface 23F corresponding to the front surface side of the heat radiation base body 23 and the board fixing surface 23F corresponding to the back surface side of the heat radiation base body 23 are formed so as to be substantially parallel to each other. Therefore, the first power conversion circuit board 24, the first control circuit board 25, the second power conversion circuit board 26 and the second control circuit board 27 are also arranged to be substantially parallel to each other.

However, it is advantageous for a heat capacity of the board that rapidly stores (or accumulates) the heat generated in the electronic elements or components to be large in efficiently removing the heat generated in the electronic elements or components of the electronic control unit, Further, it is advantageous for a heat capacity of the other electronic control unit (e.g. the sub-electronic control unit) to be large in efficiently removing the heat generated in one electronic control unit (e.g. the main electronic control unit). For the same reason, it is advantageous for a contacting area that contacts the heat radiation base body 23 to be large in efficiently removing the heat generated in the electronic control unit. From such reasons, the present embodiment employs the following configuration. This configuration is also one of the outstanding features of the present embodiment.

In the present embodiment, first, the first control circuit board 25 and the second control circuit board 27 are fixed to the heat radiation base body 23 with these boards 25 and 27 slanting or leaning, and a board area of each of the first control circuit board 25 and the second control circuit board 27 is set to be large, then a large heat capacity to store (or accumulate) the heat is secured. Further, the first power conversion circuit board 24 and the second power conversion circuit board 26 are fixed to the heat radiation base body 23 with these boards 24 and 26 slanting or leaning, and a contact area of each of the first power conversion circuit board 24 and the second power conversion circuit board 26 to the heat radiation base body 23 is set to be large, then rapid removal of the heat from the first power conversion circuit board 24 and the second power conversion circuit board 26 to the heat radiation base body 23 is secured.

Figure 9:
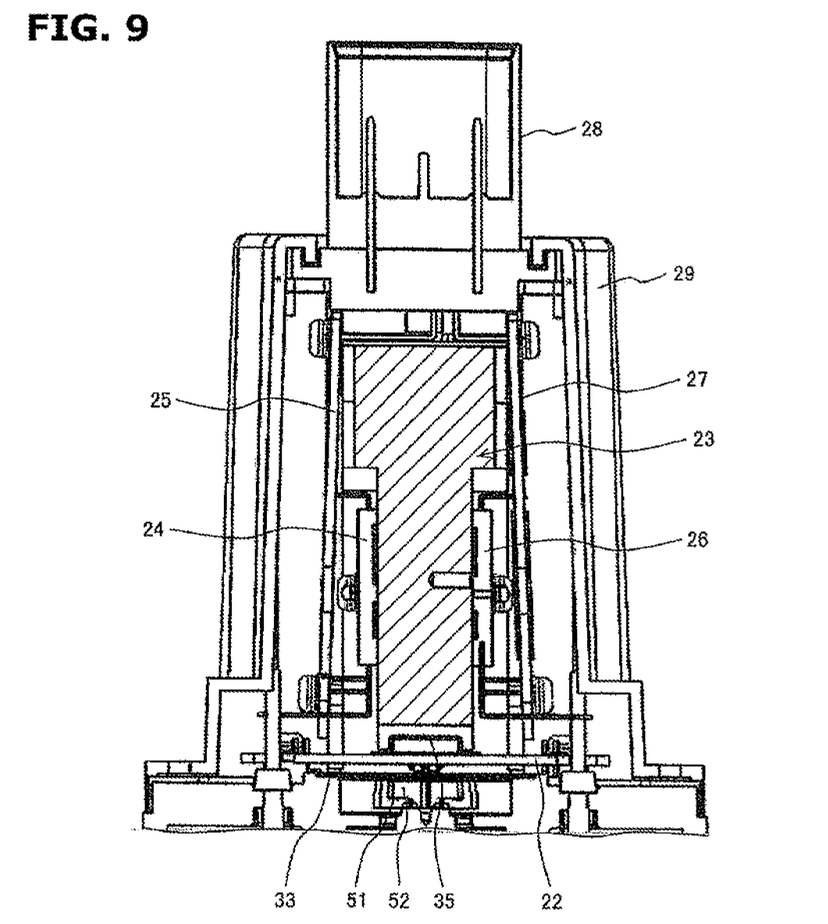
FIG. 9 is a longitudinal cross section of an A-A line of FIG. 8, and explains a modified example.

In FIG. 9, the first control circuit board 25 and the second control circuit board 27 are fixed to the heat radiation base body 23 with these boards 25 and 27 slanting or leaning so as to expand or broaden toward a lower side with respect to the heat radiation base body 23. When the first control circuit board 25 and the second control circuit board 27 slant or lean in this manner, as compared with a case where, as shown in FIG. 3, the first control circuit board 25 and the second control circuit board 27 are arranged to be substantially parallel to each other, the board area is increased. Therefore, since additional heat storing or accumulation by this increased board area can be made, it is possible to rapidly remove the heat generated in the electronic elements or components mounted on the boards to the boards. Heat resistance of the electronic elements or components can therefore be improved.

Further, the first power conversion circuit board 24 and the first control circuit board 25 are provided on the front surface of the heat radiation base body 23, and the second power conversion circuit board 26 and the second control circuit board 27 are provided on the back surface of the heat radiation base body 23. Therefore, in the normal condition, a part of the heat generated in an operating condition of the first power conversion circuit board 24 and the first control circuit board 25 is stored (or accumulated) in the second power conversion circuit board 26 and the second control circuit board 27 through the heat radiation base body 23. It is thus possible to remove the heat of the first power conversion circuit board 24 and the first control circuit board 25 rapidly and efficiently.

Moreover, by leaning the first control circuit board 25 and the second control circuit board 27, a distance between an inner surface of the cover 29 and each of the first control circuit board 25 and the second control circuit board 27 is shortened, and the heat from the first control circuit board 25 and the second control circuit board 27 is easily transmitted to the cover 29, thereby increasing a heat radiation amount from the cover 29.

Next, although the following configuration is not illustrated in FIG. 9, the heat radiation base body 23 could be formed into a shape that slants or leans so as to expand or broaden toward a lower side in line with the leaning shapes of the first control circuit board 25 and the second control circuit board 27, and the first power conversion circuit board 24 and the second power conversion circuit board 26 could be fixed to leaning surfaces of the heat radiation base body 23 with these boards 24 and 26 leaning. When the first power conversion circuit board 24 and the second power conversion circuit board 26 slant or lean in this manner, as compared with a case where, as shown in FIG. 3, the first power conversion circuit board 24 and the second power conversion circuit board 26 are arranged to be substantially parallel to each other, a contact area of each of the first power conversion circuit board 24 and the second power conversion circuit board 26 to the heat radiation base body 23 can be increased. Therefore, since additional rapid heat removal from the first power conversion circuit board 24 and the second power conversion circuit board 26 to the heat radiation base body 23 by this increased contact area can be made, heat resistance of the electronic elements or components can be improved.

As described above, in the present embodiment, the heat radiation base body extending in the axial direction of the electric motor is provided at the end surface of the motor housing, and the boards of the electronic control unit of the redundant system are fixed to the heat radiation base body along a direction in which the heat radiation base body extends with thermal conduction between the boards and the heat radiation base body allowed or secured. Further, the cover that covers these heat radiation base body and the boards is fixed to the end surface of the motor housing without using a bolt. Therefore, size reduction of the electric drive device in the radial direction can be achieved. Further, since the heat from each board radiates to the housing of the electric motor unit through the heat radiation base body, even though the size reduction is made, it is possible to efficiently radiate the heat from the board to the outside. Moreover, a housing to accommodate the electronic control unit is not necessary, and a sealing part is only a connecting portion between the motor housing and the cover. Therefore, an additional structure of the sealing part, a sealing component required for the seal and a bolt can be eliminated, thereby reducing component count.

As explained above, the present invention has the following configuration. The heat radiation base body that extends in the direction of the rotation shaft of the electric motor close to the rotation shaft of the electric motor is provided at the end surface of the motor housing accommodating therein the electric motor. And, the board of one electronic control unit of the redundant system is fixed to the heat radiation base body along a direction in which the heat radiation base body extends with thermal conduction between the board and the heat radiation base body allowed or secured. Further, the board of the other electronic control unit of the redundant system is fixed to the heat radiation base body along the direction in which the heat radiation base body extends, so as to face to the board of the one electronic control unit of the redundant system, with thermal conduction between the board and the heat radiation base body allowed or secured. Furthermore, the cover that covers these heat radiation base body and the boards is fixed to the end surface of the motor housing without using a bolt.

According to the configuration of the present invention, since the boards of the electronic control unit of the redundant system are fixed to and supported by the motor housing through the heat radiation base body, a housing to accommodate the electronic control unit is not necessary, thereby achieving the size reduction. Further, a sealing part is only a connecting portion between the motor housing and the cover. Therefore, an additional structure of the sealing part, a sealing component required for the seal and a bolt can be eliminated, thereby reducing component count.

The present invention is not limited to the above embodiment, and includes all design modifications. The above embodiment is an embodiment that is explained in detail to easily understand the present invention, and the present invention is not necessarily limited to the embodiment having all elements or components described above. Further, a part of the configuration of the embodiment can be replaced with a configuration of other embodiments. Also, the configuration of other embodiments could foe added to the configuration of the embodiment. Moreover, regarding a part of the configuration of the embodiment, the configuration of other embodiments could be added, removed and replaced.

The invention claimed is:

1. An electric drive device comprising:
a motor housing accommodating therein an electric motor that drives a mechanical control element;
a heat radiation base body fixed to an end surface, which is an opposite side to an output shaft portion of a rotation shaft of the electric motor, of the motor housing and extending in a direction of the rotation shaft which is the opposite side to the output shaft portion;
one electronic control unit of a redundant system, the one electronic control unit arranged along a direction in which the heat radiation base body extends and having a board that is fixed to the heat radiation base body with thermal conduction to the heat radiation base body allowed;
the other electronic control unit of the redundant system, the other electronic control unit arranged along a direction in which the heat radiation base body extends and having a board that is fixed to the heat radiation base body with thermal conduction to the heat radiation base body allowed; and
a cover covering the heat radiation base body and the one and the other electronic control units and liquid-tightly connected to the end surface of the motor housing at a facing surface of the cover with the end surface of the motor housing without using a bolt.

2. The electric drive device as claimed in claim 1, wherein:
liquid-tight connection between the end surface of the motor housing and the cover is maintained by a weld-connecting part.

3. The electric drive device as claimed in claim 2, wherein:
the heat radiation base body is fixed to the end surface of the motor housing at a position close to an area where the rotation shaft is disposed, and
the one electronic control unit and the other electronic control unit are arranged at opposite sides of the heat radiation base body.

4. The electric drive device as claimed in claim 3, wherein:
the heat radiation base body has fixing surfaces of the boards of the one electronic control unit and the other electronic control unit, accommodation recessed portions formed on the respective fixing surfaces, and fixing flat surface portions enclosing the respective accommodation recessed portions,
power conversion circuit boards that form the one and the other electronic control units are fixed to the accommodation recessed portions, and
control circuit boards that form the one and the other electronic control units are fixed to the fixing flat surface portions so as to cover the respective power conversion circuit boards.

5. The electric drive device as claimed in claim 4, wherein:
a position detection circuit board that detects a rotation position of a rotor of the electric motor is fixed to the end surface of the motor housing,
supporting stems that support the heat radiation base body are formed integrally with the end surface of the motor housing and arranged at opposite sides of the position detection circuit board, and
the heat radiation base body is fixed to the supporting stems.

6. The electric drive device as claimed in claim 4, wherein:
a power conversion circuit and a power supply circuit except an electrolytic capacitor are mounted on the power conversion circuit boards forming the one and the other electronic control units, and
a microcomputer that controls the power conversion circuit, a peripheral device and the electrolytic capacitor of the power supply circuit are mounted on the control circuit boards forming the one and the other electronic control units.

7. An electric power steering device comprising:
an electric motor providing a steering assistive force to a steering shaft on the basis of an output from a torque sensor that detects a turning direction and a turning torque of the steering shaft;
a motor housing accommodating therein the electric motor;
a heat radiation base body fixed to an end surface, which is an opposite side to an output shaft portion of a rotation shaft of the electric motor, of the motor housing and extending in a direction of the rotation shaft which is the opposite side to the output shaft portion;
one electronic control unit of a redundant system, the one electronic control unit arranged along a direction in which the heat radiation base body extends and having a board that is fixed to the heat radiation base body with thermal conduction to the heat radiation base body allowed;
the other electronic control unit of the redundant system, the other electronic control unit arranged along a direction in which the heat radiation base body extends and having a board that is fixed to the heat radiation base body with thermal conduction to the heat radiation base body allowed; and
a cover covering the heat radiation base body and the one and the other electronic control units and liquid-tightly connected to the end surface of the motor housing at a facing surface of the cover with the end surface of the motor housing without using a bolt.

8. The electric power steering device as claimed in claim 7, wherein:
liquid-tight connection between the end surface of the motor housing and the cover is maintained by a weld-connecting part.

9. The electric power steering device as claimed in claim 8, wherein:
the heat radiation base body is fixed to the end surface of the motor housing at a position close to an area where the rotation shaft is disposed, and
the one electronic control unit and the other electronic control unit are arranged at opposite sides of the heat radiation base body.

10. The electric power steering device as claimed in claim 9, wherein:
the heat radiation base body has fixing surfaces of the boards of the one electronic control unit and the other electronic control unit, accommodation recessed portions formed on the respective fixing surfaces, and fixing flat surface portions enclosing the respective accommodation recessed portions,
power conversion circuit boards that form the one and the other electronic control units are fixed to the accommodation recessed portions, and
control circuit boards that form the one and the other electronic control units are fixed to the fixing flat surface portions so as to cover the respective power conversion circuit boards.

11. The electric power steering device as claimed in claim 10, wherein:
a position detection circuit board that detects a rotation position of a rotor of the electric motor is fixed to the end surface of the motor housing,
supporting stems that support the heat radiation base body are formed integrally with the end surface of the motor housing and arranged at opposite sides of the position detection circuit board, and
the heat radiation base body is fixed to the supporting stems.

12. The electric power steering device as claimed in claim 10, wherein:
a power conversion circuit and a power supply circuit except an electrolytic capacitor are mounted on the power conversion circuit boards forming the one and the other electronic control units, and
a microcomputer that controls the power conversion circuit, a peripheral device and the electrolytic capacitor of the power supply circuit are mounted on the control circuit boards forming the one and the other electronic control units.

* * * * *